(12) United States Patent
Hayes

(10) Patent No.: US 8,491,024 B2
(45) Date of Patent: Jul. 23, 2013

(54) DUAL GRIP ANGLED HANDLED SHOVEL

(76) Inventor: Brian W. Hayes, South Fallsburg, NY (US)

( * ) Notice: Subject to any disclaimer, the term of this patent is extended or adjusted under 35 U.S.C. 154(b) by 242 days.

(21) Appl. No.: 13/068,806

(22) Filed: May 20, 2011

(65) Prior Publication Data

US 2012/0292934 A1    Nov. 22, 2012

(51) Int. Cl.
*A01B 1/02* (2006.01)
*E01B 5/02* (2006.01)

(52) U.S. Cl.
USPC ............................ 294/51; 294/58; 294/54.5

(58) Field of Classification Search
USPC ... 294/49, 54.5, 57, 58, 51, 176, 177; 16/426; D8/10; 37/285
See application file for complete search history.

(56) References Cited

U.S. PATENT DOCUMENTS

| | | | | |
|---|---|---|---|---|
| 2,521,441 A * | 9/1950 | Bickley | | 294/58 |
| 3,317,098 A * | 5/1967 | Auraen | | 224/609 |
| 4,128,266 A * | 12/1978 | Vaslas | | 294/58 |
| 4,772,057 A * | 9/1988 | Harvey | | 294/58 |
| 5,400,471 A * | 3/1995 | Lichfield et al. | | 16/426 |
| 5,472,252 A * | 12/1995 | Barone | | 294/58 |
| 7,077,444 B2 * | 7/2006 | Kaufman et al. | | 294/58 |
| 8,183,007 B2 * | 5/2012 | Zegzouti et al. | | 435/15 |

* cited by examiner

*Primary Examiner* — Paul T Chin
(74) *Attorney, Agent, or Firm* — Ruth Eure (57) ABSTRACT

A dual grip handled shovel for clearing a surface is disclosed. The shovel comprises a grip handle having a front grip attached to a rear grip by way of a central portion. A tool handle includes a front truss pair attached to a first end of the central portion and a rear truss pair attached to a second end of the central portion. A tool head includes a leading edge and a lagging edge which is operatively attached to the front truss pair and rear truss pair. The central portion, the tool handle and the lagging edge of the tool head are attached in a way to form a tetrahedron which distributes the load evenly to provide an ease of use to a user. The front truss pair and the rear truss pair distribute the load evenly between the grip handle and the tool head thereby balancing the load dynamically.

19 Claims, 6 Drawing Sheets

DUAL GRIP ANGLED HANDLED SHOVEL

CROSS-REFERENCE TO RELATED APPLICATIONS

Not Applicable.

STATEMENT REGARDING FEDERALLY SPONSORED RESEARCH AND DEVELOPMENT

Not Applicable.

FIELD OF THE INVENTION

This invention relates to shovels, and more particularly to an improved shovel having a dual grip handle.

DISCUSSION OF RELATED ART

A shovel is a tool for digging, lifting, and moving bulk materials, such as soil, gravel, snow or sand. Tools like snow shovels, shovels for digging, shovels for lifting dirt, rocks etc. have been around for centuries. Most shovels typically have straight handles that can cause great strain to the user's back, arms, wrists, and legs, that may limit the capacity of work that a user can perform. These straight tool handles have a single axis of attachment that intersects the tool head which can create a great amount of torque that must be offset by the user's hands. When a user's two hands are used on these tool handles to get lifting leverage, the user must bend his/her back to reach two points on the handle. This decreases the lifting power of the arms and requires more lifting force to be applied by the user.

One prior art, described in U.S. Pat. No. 7,077,444 issued to Kaufman on Jul. 18, 2006 describes a two-handled shovel for clearing a surface. The shovel comprises a blade having a leading edge which contacts the surface, a main handle attached to the blade, and an auxiliary handle pivotally attached to the blade near the leading edge. The auxiliary handle is used to assist the user in removing the snow, dirt, gravel and other heavy debris from the surface. The shovel may be used by two users simultaneously with one user pushing the blade with the main handle while the second user pulls the blade with the auxiliary handle. However, the user needs to push the shovel forward to collect snow in the blade which can cause a great strain to the user's back.

U.S. Pat. No. 6,601,887, issued to Graves on Aug. 5, 2003, describes a frame assembly for attachment to an elongated shaft of a tool. The frame assembly is arranged to increase the leverage and handling capabilities of the tool. The frame assembly comprises a triangularly shaped frame having a housing portion leg, a forward leg and a rearward leg. The forward and the rearward legs meet at an apex of the frame assembly. An articulable handle is arranged on the apex of the frame assembly to permit the tool to be leveraged by a user of the frame assembly in an enhanced manner. A mechanism secures the housing portion leg to the shaft of the tool. However, the frame assembly has a single axis of attachment that intersects the tool which requires more lifting force to be applied by the user.

U.S. Pat. No. 4,103,954, issued to Vaslas on Aug. 1, 1978, describes a snow shovel having a plate-shaped scoop, a main handle and an adjustable auxiliary handle. The main handle is a rod rigidly affixed to one end to the scoop and having a first hand grip at the other end. The auxiliary handle includes a pair of rods which diverge from one another in the direction from the closely juxtaposed first ends to widely spaced second ends. A second hand grip is secured to the auxiliary handle rods at the first ends thereof, and respective hinges interconnect the auxiliary handle rods to the scoop. A rigid crossbrace bar, which may be medially foldable, is connected at one of its ends to the auxiliary handle rods. The auxiliary handle may be combined with existing, conventional snow shovels using a coupling means. However, the auxiliary handle rods and the main handle do not distribute the load evenly between the hands of the user thereby limiting the capacity of each shovel load.

Therefore, there is a need for a shovel that would provide an improved dual handle structure in such a way as to enable strain-free, ease of use to the user. Such a needed device would distribute the load evenly between the hands of the user. Further, the device would be made of a light weight material and would provide better load bearing properties than existing models. The present invention accomplishes all these objectives.

SUMMARY OF THE INVENTION

The present invention is a dual grip handled shovel for clearing a surface. The dual grip handled shovel comprises a grip handle having a front grip attached to a rear grip by way of a central portion. A tool handle includes a front truss pair attached to a first end of the central portion and a rear truss pair attached to a second end of the central portion. A tool head includes a leading edge and a lagging edge which is operatively attached to the front truss pair and the rear truss pair. The central portion, the tool handle and the lagging edge of the tool head are attached in a way to form a tetrahedron which distributes the load evenly to provide an ease of use to a user.

The front grip is connected to the first end of the central portion and the rear grip is connected to the second end of the central portion forming the grip handle. The front truss pair and the rear truss pair include a first member and a second member. The front truss pair is converged at the first end of the central portion defining a front truss angle and is diverged towards the lagging edge to define a front triangle. The rear truss pair is converged at the second end of the central portion defining a rear truss angle and is diverged towards the lagging edge to define a rear triangle. The central portion of the grip handle, the front triangle, the rear triangle and the lagging edge of the tool head define the tetrahedron. The tetrahedral arrangement provides a structure which distributes the load evenly between the grip handle and the tool head. The grip handle, the tool handle and the tool head are connected using an attachment means such as nuts, bolts and screws.

The dual grip handled shovel can be used by the user standing in an upright position. The user can place his fists at the front grip and the rear grip respectively. From this position, the user needs only to flex his fists to apply a minimal force at the front grip and the rear grip while the wrists of the user may remain at rest. The force applied at the front grip and the rear grip is distributed evenly to the first end and the second end of the central portion. The force from the first end and the second end are then maximally distributed onto the tool head. The grip handle employs the G-force to distribute the load evenly between the hands of the user. The length of the grip handle can be extended and retracted depending on the need of the user. The front truss pair and the rear truss pair act as alternate tensile and compression truss pairs to distribute the load evenly between the grip handle and the tool head thereby balancing the load dynamically. The grip handle and the tool head are arranged to be non-intersecting and orthogonal. This arrangement brings both hands on the grip handle within reach to the user standing at rest. Thus the upright standing posture and the position of the straight fists provide the most stable, strain free position to the user.

The grip handle, the front truss pair, the rear truss pair and the tool head can be detached and stored separately when not in use. The tool head is selected from a group consisting of a shovel blade, rake blade, hoe blade, trowel blade, roller blade, scooper blade, pick blade and scoop. The dual grip handled shovel can be utilized for removing snow, digging, lifting dirt and rocks. The dual grip handled shovel is made of a material selected from a group consisting of wood, plastic, steel and aluminum.

The present invention provides an improved dual handle structure in such a way as to enable strain-free, ease of use to the user. Such a device distributes the load evenly between the hands of the user. Further, the device is made of a light weight material. Moreover, the device provides better load bearing properties. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Figure 1:
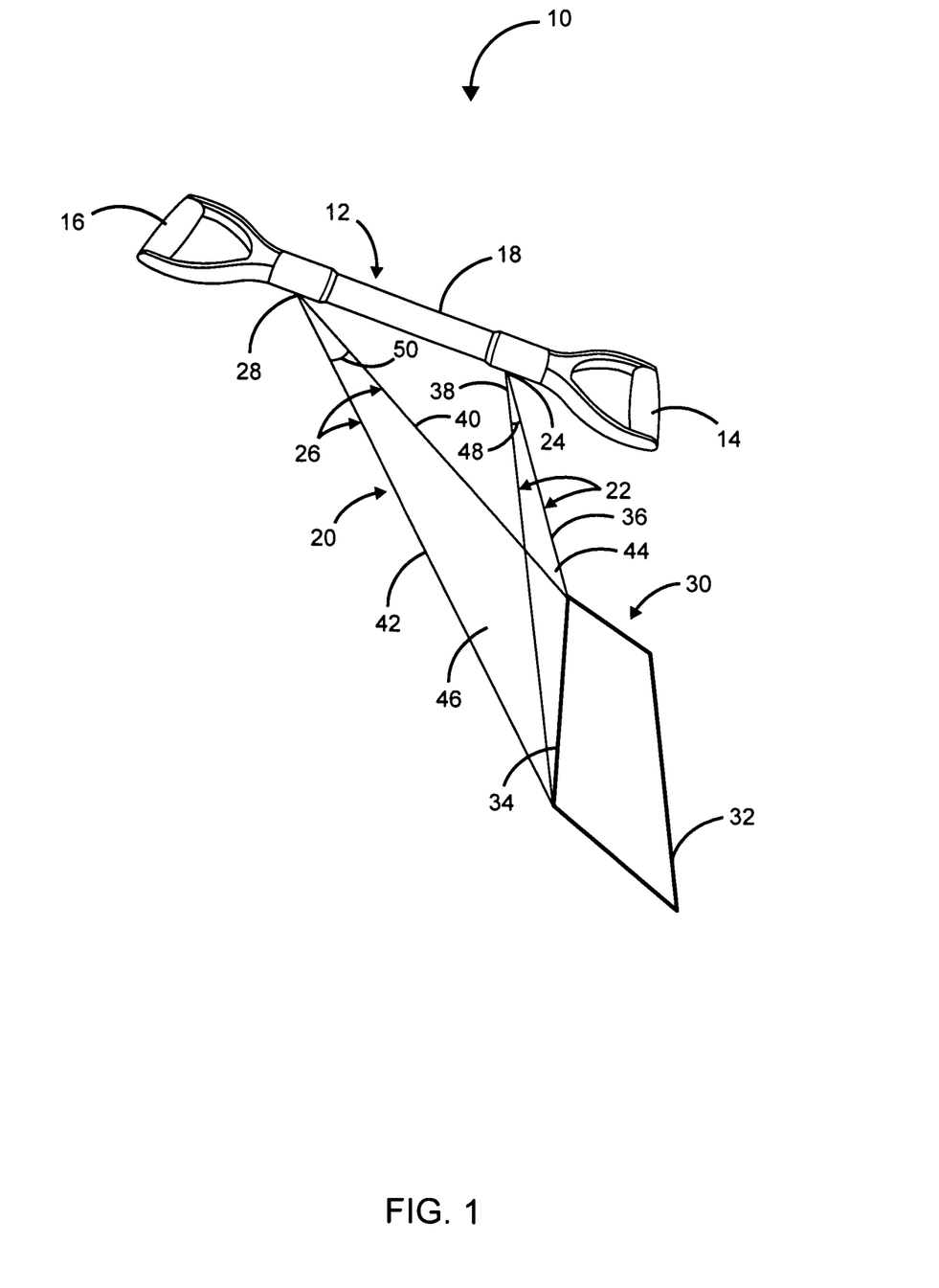
FIG. 1 is a perspective view of the invention, illustrating a dual grip handled shovel.

FIG. 1 is a perspective view of a dual grip handled shovel 10 for clearing a surface. The dual grip handled shovel 10 comprises a grip handle 12 having a front grip 14 attached to a rear grip 16 by way of a central portion 18. A tool handle 20 includes a front truss pair 22 attached to a first end 24 of the central portion 18 and a rear truss pair 26 attached to a second end 28 of the central portion 18. A tool head 30 includes a leading edge 32 and a lagging edge 34 which is operatively attached to the front truss pair 22 and the rear truss pair 26. The central portion 18, the tool handle 20 and the lagging edge 34 of the tool head 30 are attached in a way to form a tetrahedron which distributes the load evenly to provide an ease of use to a user (not shown).

The front truss pair 22 includes a first member 36 and a second member 38 and the rear truss pair 26 includes a first member 40 and a second member 42. The front truss pair 22 is converged at the first end 24 of the central portion 18 defining a front truss angle 48 and is diverged towards the lagging edge 34 to define a front triangle 44. The rear truss pair 26 is converged at the second end 28 of the central portion 18 defining a rear truss angle 50 and is diverged towards the lagging edge 34 to define a rear triangle 46. The central portion 18 of the grip handle 12, the front triangle 44, the rear triangle 46 and the lagging edge 34 of the tool head 30 define the tetrahedron.

Figure 2:
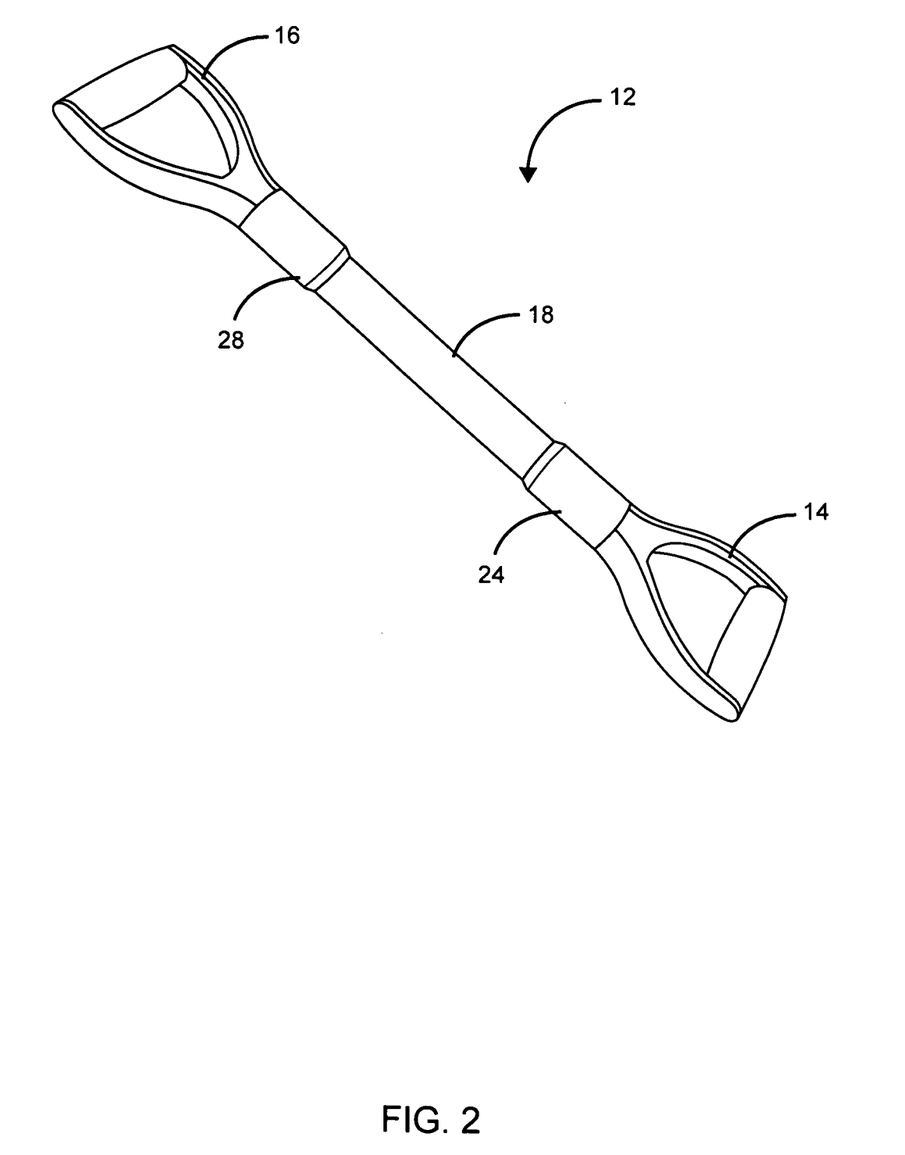
FIG. 2 is a perspective view of the invention, illustrating a grip handle of the dual grip handled shovel.

FIG. 2 is a perspective view of the grip handle 12 of the dual grip handled shovel 10. The front grip 14 is connected to the first end 24 of the central portion 18 and the rear grip 16 is connected to the second end 28 of the central portion 18 forming the grip handle 12. The grip handle 12 employs the G-force at the front truss pair 22 and the rear truss pair 26 so as to evenly distribute the load between the hands of the user (not shown). The grip handle 12 distributes the load simultaneously through the front grip 14 and the rear grip 16. The grip handle 12 may be of variable length. The length of the grip handle 12 may be extended and retracted depending on the need of the user (not shown). The front grip 14 and the rear grip 16 may be made of plastic material.

Figure 3:
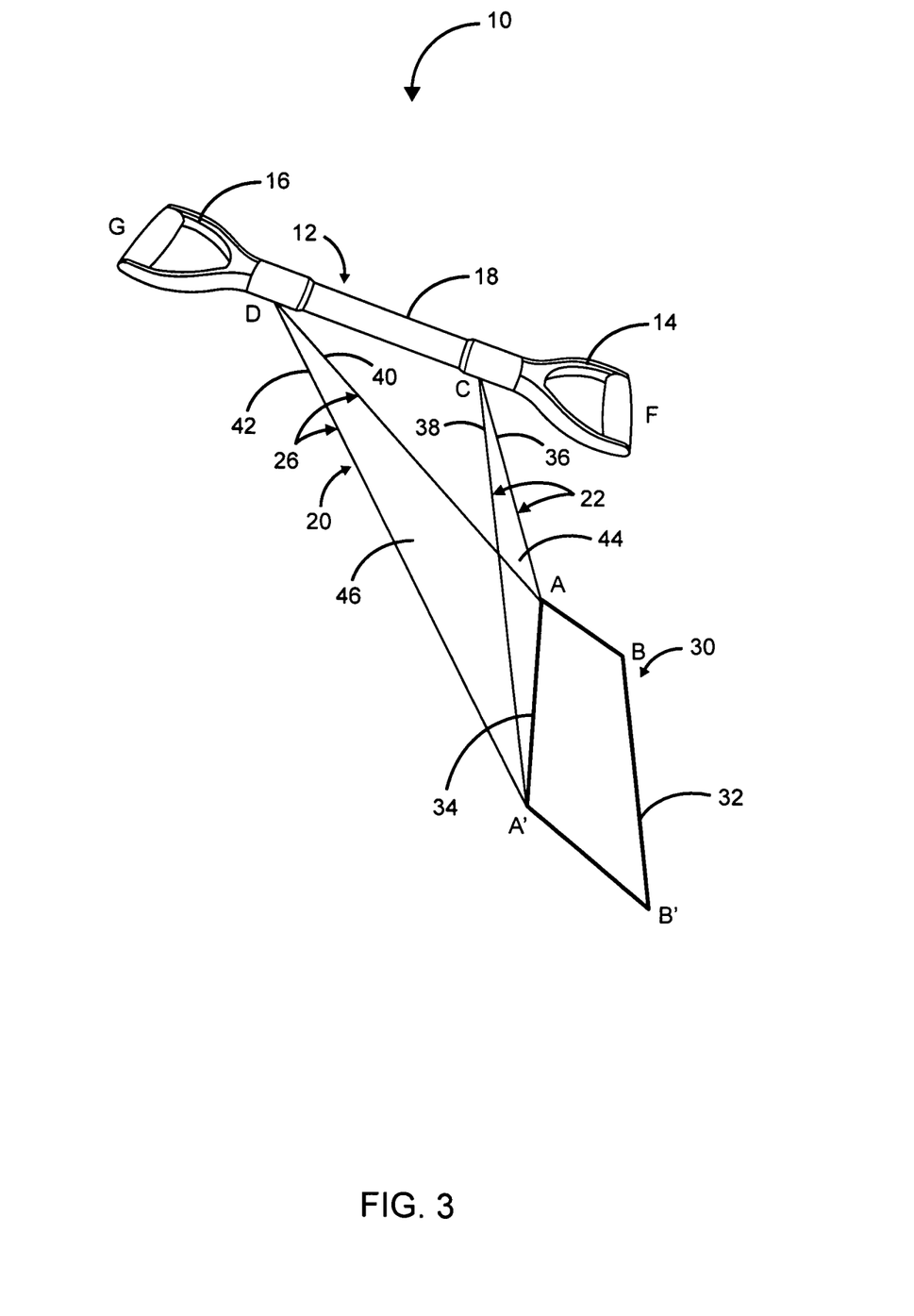
FIG. 3 is a perspective view of the invention, illustrating the various points of distribution of load through the dual grip handled shovel.

Referring to FIG. 3, the various points of distribution of load through the dual grip handled shovel 10 is illustrated. The front grip 14 labeled as "F" and the rear grip 16 labeled as "G" forms the grip handle 12 which is labeled as "FG". The front truss pair 22 includes the first member 36 labeled as AC and the second member 38 labeled as A'C. The rear truss pair 26 includes the first member 40 labeled as AD and the second member 42 labeled as A'D. The front triangle 44 is labeled as ACA' and the rear triangle 46 is labeled as ADA'. The vertices of the front triangle ACA' and the rear triangle ADA' are labeled as C and D respectively. The lagging edge 34 of the tool head 30 is labeled as AA'. The tool head 30 is labeled as AA'B'B. A minimal manual force is applied at the front grip F and the rear grip G. The force applied at the front grip F and the rear grip G are distributed evenly to the vertices C and D. The force from the vertices C and D are then maximally distributed onto the tool head AA'B'B. The front truss pairs AC, A'C and the rear truss pairs A'D,AD act as alternate tensile and compression truss pairs to distribute the load evenly between the grip handle FG and the tool head AA'B'B thereby balancing the load dynamically.

The grip handle FG and the tool head AA'B'B are arranged to be non-intersecting and orthogonal. The dual grip handled shovel 10 utilizes the tetrahedron geometry to deliver the work force between the orthogonally opposing, non-intersecting grip handle FG and the tool head AA'B'B. The grip handle FG, the front triangle ACA', the rear triangle ADA' and the lagging edge AA' of the tool head AA'B'B define the tetrahedron ACDA'. The arrangement of the dual grip handled shovel 10 as the tetrahedron ACDA' provides a structure which distributes the load evenly between the grip handle FG and the tool head AA'B'B.

Figure 4:
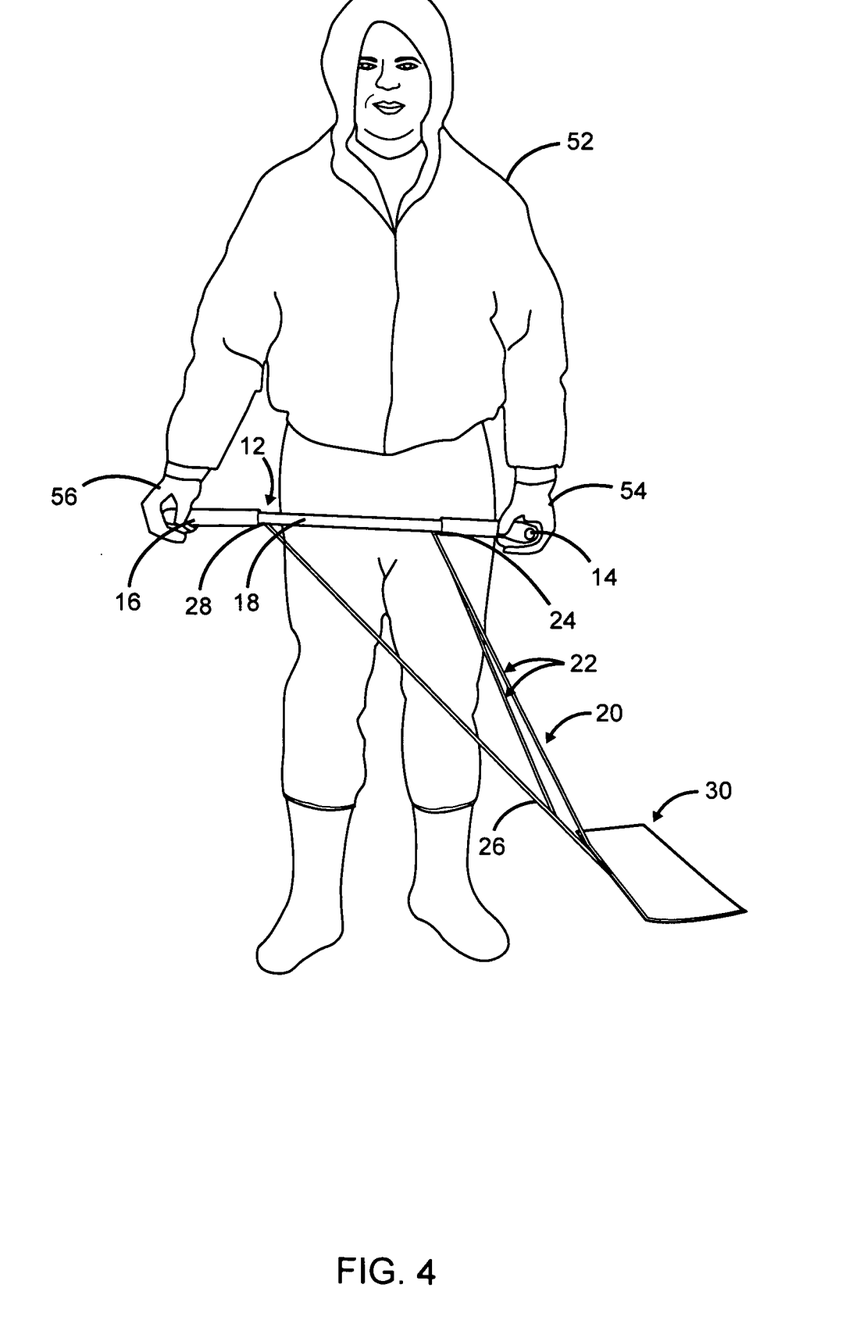
FIG. 4 is a perspective view of the present invention, illustrating the dual grip handled shovel in use.

FIG. 4 illustrates the dual grip handled shovel 10 in use. The user 52 stands in an upright position and place his fists 54, 56 at the front grip 14 and the rear grip 16 respectively. From this position, the user 52 needs only to flex his fists 54, 56 to apply a minimal force at the front grip 14 and the rear grip 16 while the wrists of the user 52 may remain at rest. The force applied at the front grip 14 and the rear grip 16 is distributed evenly to the first end 24 and the second end 28 of the central portion 18. The force from the first end 24 and the second end 28 is then maximally distributed onto the tool head 30. The grip handle 12 employs the G-force to distribute the load evenly between the hands of the user 52. The front truss pair 22 and the rear truss pair 26 act as alternate tensile and compression truss pairs to distribute the load evenly between the grip handle 12 and the tool head 30 thereby balancing the load dynamically. The grip handle 12 and the tool head 30 are arranged to be non-intersecting and orthogonal. This arrangement brings both hands on the grip handle within reach to the user 52 standing at rest. Thus the upright standing posture and the position of the straight fists 54, 56 provide the most stable, strain free position to the user 52.

Figure 5:
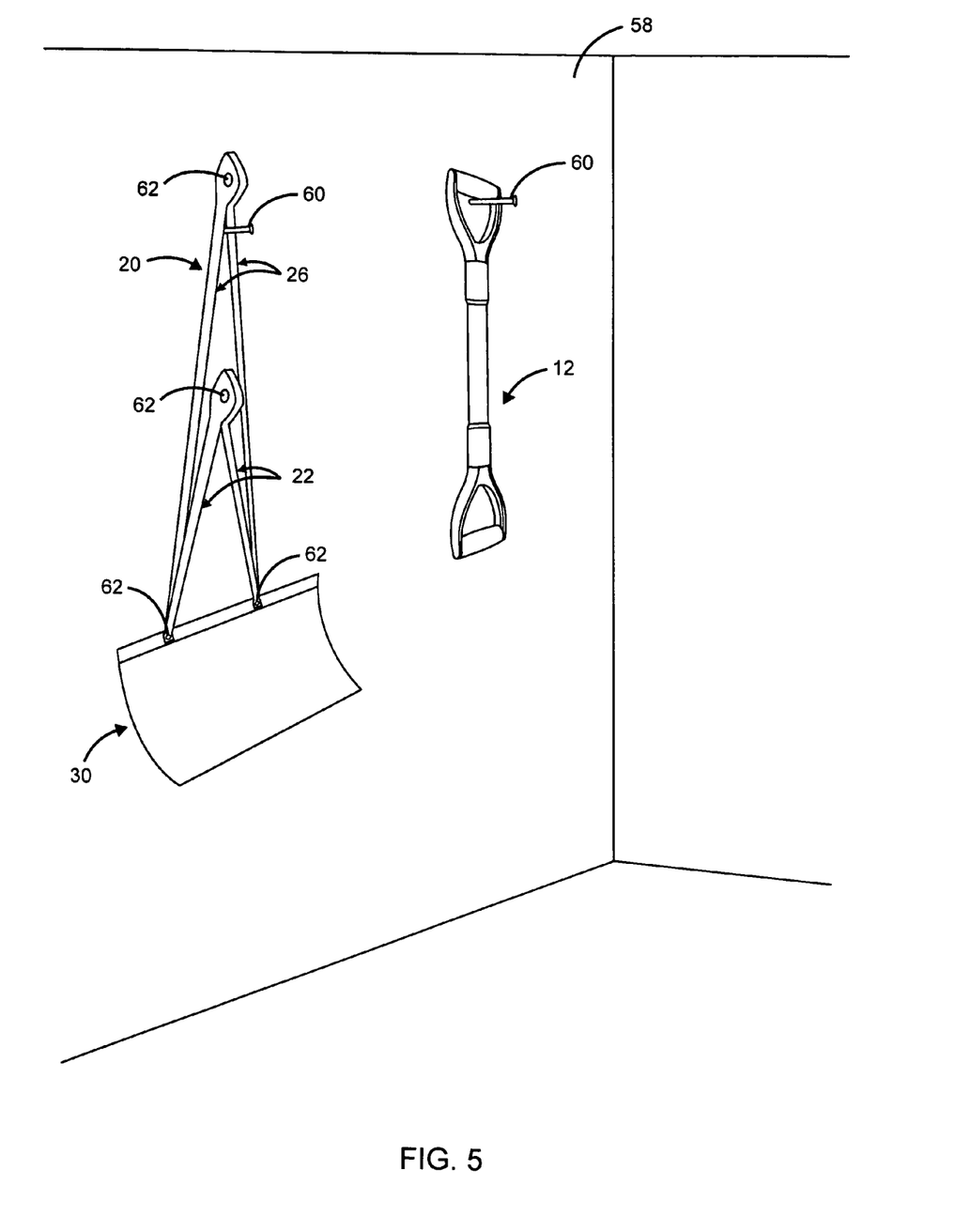
FIG. 5 is a perspective view of the invention, illustrating the grip handle and the tool handle of the dual grip handled shovel are detached and shown separately.

FIG. 5 is a perspective view of the grip handle 12 and the tool handle 20 of the dual grip handled shovel 10 detached and shown separately. The grip handle 12 and the tool handle 20 can be separated easily and attached to a wall 58 using a hanging means 60 when not in use. The grip handle 12, the tool handle 20 and the tool head 30 are connected using an attachment means 62. The attachment means 62 may be selected from a group consisting of nuts, bolts and screws. The tool head 30 may also be easily detached and replaced by means of a shovel blade, rake blade, hoe blade, trowel blade, roller blade, scooper blade, pick blade and scoop. The dual grip handled shovel 10 may be made of a material selected from a group consisting of wood, plastic, steel and aluminum which provides better load bearing properties and also makes the shovel 10 light weight. The dual grip handled shovel 10 may be utilized for removing snow, digging, lifting dirt and rocks.

Figure 6:
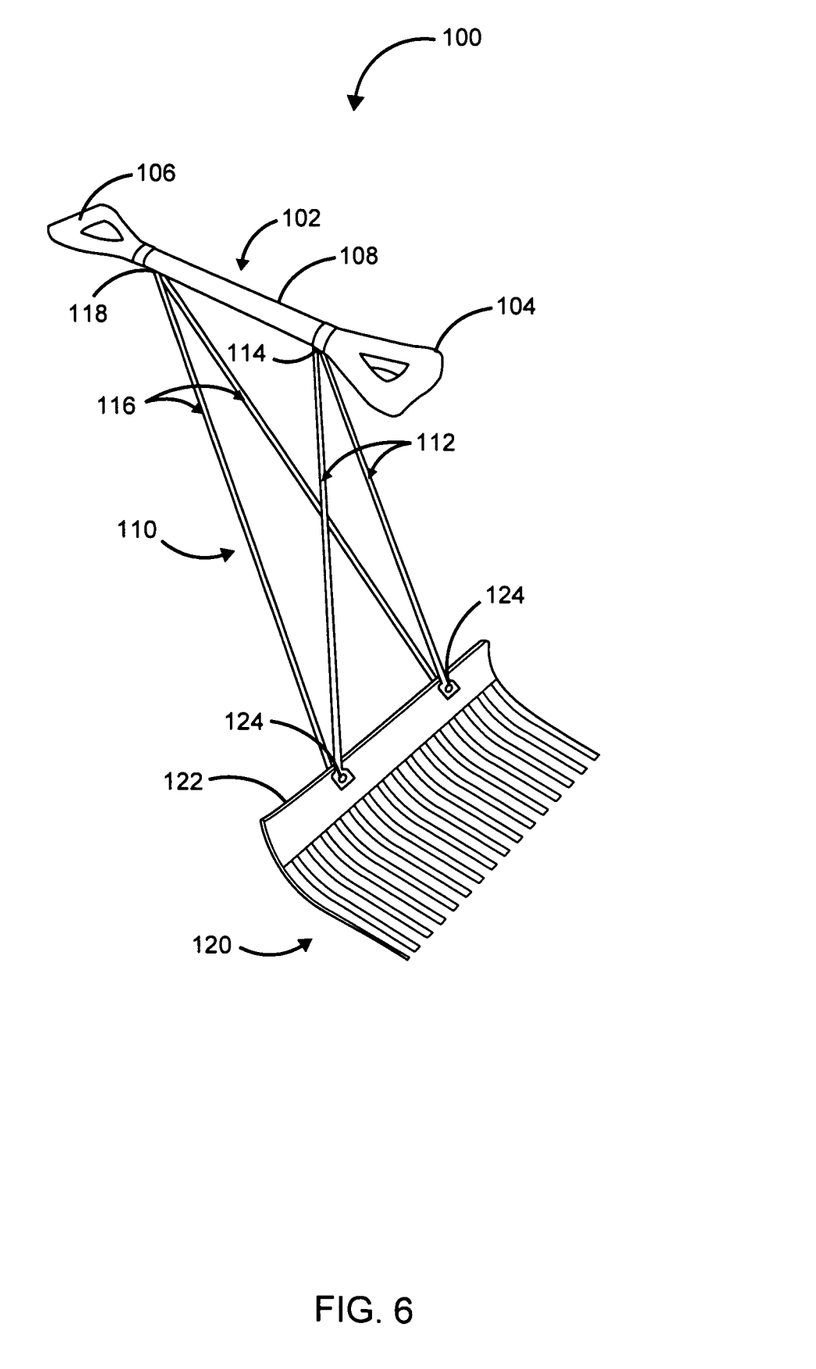
FIG. 6 is a perspective view of another embodiment of the dual grip handled shovel of the present invention.

FIG. 6 is a perspective view of another embodiment of the dual grip handled shovel 100. The dual grip handled shovel 100 comprises a grip handle 102 having a front grip 104 attached to a rear grip 106 by way of a central portion 108. A tool handle 110 includes a front truss pair 112 attached to a first end 114 of the central portion 108 and a rear truss pair 116 attached to a second end 118 of the central portion 108. A tool head 120 includes a lagging edge 122 which is operatively attached to the front truss pair 112 and the rear truss pair 116. The tool head 120 in this embodiment is a rake blade. The tool head 120 may also be selected from a group consisting of a shovel blade, hoe blade, trowel blade, roller blade, scooper blade, pick blade and scoop. The grip handle 102, the tool handle 110 and the tool head 120 are connected using an attachment means 124. The attachment means 124 may be selected from a group consisting of nuts, bolts and screws.

While a particular form of the invention has been illustrated and described, it will be apparent that various modifications can be made without departing from the spirit and scope of the invention. For example, the tool head 30 may be curved, flat or of any desirable shape. Accordingly, it is not intended that the invention be limited, except as by the appended claims.

REFERENCE NUMERALS

10 . . . Dual grip handled shovel
12 . . . Grip Handle
14 . . . Front Grip
16 . . . Rear Grip
18 . . . Central Portion of the grip handle
20 . . . Tool Handle
22 . . . Front truss pair
24 . . . First end of the central portion
26 . . . Rear truss pair
28 . . . Second end of the central portion
30 . . . Tool head
32 . . . Leading edge of the tool head
34 . . . Lagging edge of the tool head
36 . . . First member of the front truss pair
38 . . . Second member of the front truss pair
40 . . . First member of the rear truss pair
42 . . . Second member of the rear truss pair
44 . . . Front triangle
46 . . . Rear triangle
48 . . . Front truss angle
50 . . . Rear truss angle
52 . . . User
54 . . . Fist of the user
56 . . . Fist of the user
58 . . . Wall
60 . . . Hanging means
62 . . . Attachment means
100 . . . Another embodiment of the dual grip handled shovel
102 . . . Grip handle
104 . . . Front Grip
106 . . . Rear Grip
108 . . . Central Portion of the grip handle
110 . . . Tool Handle
112 . . . Front truss pair
114 . . . First end of the central portion
116 . . . Rear truss pair
118 . . . Second end of the central portion
120 . . . Tool head
122 . . . Lagging edge of the tool head
124 . . . Attachment means

What is claimed is:

1. A dual grip handled shovel for clearing a surface, comprising:
   a grip handle having a front grip attached to a rear grip by way of a central portion;
   a tool handle having a front truss pair attached to a front end of the central portion and a rear truss pair attached to a rear end of the central portion; and
   a tool head having a leading edge and a lagging edge operatively attached to the front truss pair and the rear truss pair;
   whereby the central portion, the tool handle and the lagging edge of the tool head are attached in a way to form a tetrahedron which distributes the load evenly to provide an ease of use to a user.

2. The dual grip handled shovel of claim 1 wherein the front grip is connected to the first end of the central portion and the rear grip is connected to the second end of the central portion forming the grip handle.

3. The dual grip handled shovel of claim 1 wherein the front truss pair and the rear truss pair includes a first member and a second member.

4. The dual grip handled shovel of claim 1 wherein the front truss pair is converged at the first end of the central portion and diverged towards the lagging edge to define a front triangle.

5. The dual grip handled shovel of claim 4 wherein the front truss pair is converged at the first end of the central portion forming a front truss angle.

6. The dual grip handled shovel of claim 1 wherein the rear truss pair is converged at the second end of the central portion and diverged towards the lagging edge to define a rear triangle.

7. The dual grip handled shovel of claim 6 wherein the rear truss pair is converged at the second end of the central portion forming a rear truss angle.

8. The dual grip handled shovel of claim 1 wherein the central portion of the grip handle, the front triangle, the rear triangle and the lagging edge of the tool head define the tetrahedron.

9. The dual grip handled shovel of claim 1 wherein the grip handle employs the G-force at the front truss pair and the rear truss pair so as to evenly distribute the load between the hands of the user.

10. The dual grip handled shovel of claim 1 wherein the front truss pair and the rear truss pair may act as alternate tensile and compression truss pairs to distribute the load evenly to the front grip, the rear grip and the tool head.

11. The dual grip handled shovel of claim 1 wherein the grip handle and the tool head are non-intersecting.

12. The dual grip handled shovel of claim 1 wherein the grip handle and the tool head are orthogonal.

13. The dual grip handled shovel of claim 1 wherein the grip handle, the tool handle and the tool head are connected using an attachment means.

14. The dual grip handled shovel of claim 13 wherein the attachment means may be selected from a group consisting of nuts, bolts and screws.

15. The dual grip handled shovel of claim 1 wherein the grip handle may be of variable length.

16. The dual grip handled shovel of claim 1 wherein the dual grip handled shovel may be utilized for removing snow, digging, lifting dirt and rocks.

17. The dual grip handled shovel of claim 1 wherein the grip handle, the front truss pair, the rear truss pair and the tool head may be detached and stored separately when not in use.

18. The dual grip handled shovel of claim 1 wherein the tool head may be selected from a group consisting of a shovel blade, rake blade, hoe blade, trowel blade, roller blade, scooper blade, pick blade and scoop.

19. The dual grip handled shovel of claim 1 wherein the dual grip handled shovel may be made of a material selected from a group consisting of wood, plastic, steel and aluminum.

\* \* \* \* \*